US010362389B2

(12) United States Patent
Proni et al.

(10) Patent No.: US 10,362,389 B2
(45) Date of Patent: Jul. 23, 2019

(54) SELF-DRAINING BAND-PASS LOUDSPEAKER SYSTEM

(71) Applicants: Lucio Proni, Weston, FL (US); Bellal J Hamze, Margate, FL (US); Donald C Nesbit, Jr., North Bay Village, FL (US)

(72) Inventors: Lucio Proni, Weston, FL (US); Bellal J Hamze, Margate, FL (US); Donald C Nesbit, Jr., North Bay Village, FL (US)

(73) Assignee: JL Audio, Inc., Miramar, FL (US)

( * ) Notice: Subject to any disclaimer, the term of this patent is extended or adjusted under 35 U.S.C. 154(b) by 19 days.

(21) Appl. No.: 15/484,312

(22) Filed: Apr. 11, 2017

(65) Prior Publication Data

US 2018/0084334 A1 Mar. 22, 2018

Related U.S. Application Data

(60) Provisional application No. 62/482,363, filed on Apr. 6, 2017, provisional application No. 62/397,597, filed on Sep. 21, 2016.

(51) Int. Cl.

| | |
|---|---|
| ***H04B 1/08*** | (2006.01) |
| ***H04R 1/28*** | (2006.01) |
| ***H04R 1/02*** | (2006.01) |

(52) U.S. Cl.

CPC ........... *H04R 1/2849* (2013.01); *H04R 1/025* (2013.01); *H04R 1/2888* (2013.01); *H04R 1/028* (2013.01); *H04R 2499/13* (2013.01)

(58) Field of Classification Search

CPC . H04R 1/025; H04R 1/26; H04R 1/44; H04R 1/2849; H04R 1/2888; H04R 1/028; H04R 2499/13; B60R 11/0217; G10K 2210/127; G10K 2210/128

USPC ......... 381/86, 338, 335, 345, 337, 352, 386, 381/302; 181/149, 150, 152

See application file for complete search history.

(56) References Cited

U.S. PATENT DOCUMENTS

| | | | | |
|---|---|---|---|---|
| 3,043,912 A * | 7/1962 | De Laney | H04M 9/001 | 181/148 |
| 3,108,653 A * | 10/1963 | Valldeperas | H04R 1/345 | 181/150 |
| 3,642,091 A * | 2/1972 | Nohara | H04R 1/028 | 181/150 |
| 3,827,391 A * | 8/1974 | Stanberry, Sr. | B63B 1/24 | 114/274 |
| 4,058,075 A * | 11/1977 | Piper, Sr. | B63B 59/04 | 114/222 |
| 6,078,676 A * | 6/2000 | Takenaka | H04R 1/345 | 181/145 |
| 2005/0058315 A1* | 3/2005 | Poling | H04R 1/2826 | 381/337 |
| 2009/0168024 A1* | 7/2009 | Hayashi | G03B 31/00 | 353/15 |
| 2016/0044274 A1* | 2/2016 | Wang | H04N 5/642 | 348/794 |

* cited by examiner

*Primary Examiner* — Norman Yu

(74) *Attorney, Agent, or Firm* — GrayRobinson, P.A.; Thomas L. Kautz

(57) ABSTRACT

A loudspeaker system comprises a driver mounted within the interior of a single-reflex band-pass box which is self-draining to protect the driver from exposure to standing water. The band-pass box may be mounted at the stern of a boat to direct acoustic energy from the driver to an individual being towed behind it.

22 Claims, 13 Drawing Sheets

SELF-DRAINING BAND-PASS LOUDSPEAKER SYSTEM

FIELD OF THE INVENTION

This invention relates to loudspeaker systems, and, more particularly, to a loudspeaker system which may be used in watercraft wherein a driver is mounted within a single-reflex band-pass box that is self-draining to protect the driver from exposure to standing water.

BACKGROUND OF THE INVENTION

Loudspeaker systems are frequently utilized in applications such as watercraft where exposure to water and other elements can damage the system's driver(s). In sound systems for boats, the drivers are typically mounted in side bulkheads near the entertainment areas of the vessel to protect them from water damage and to direct acoustic output toward passengers seated in such areas. Smaller boats such as ski boats, bow riders, wakeboard boats and deck boats do not have a cabin or enclosed helm, and therefore essentially the entire deck area is open to the air. This allows acoustic energy from the drivers to dissipate quickly as it radiates into space, and it is particularly difficult for such systems to provide quality sound behind the boat such as to a skier being towed.

SUMMARY OF THE INVENTION

This invention is directed to a loudspeaker system including a driver mounted within the interior of a single-reflex band-pass box which is self-draining to protect the driver from exposure to standing water. The band-pass box may be mounted at the stern of the boat to direct acoustic energy to one being towed behind it.

In one presently preferred embodiment, the band-pass box is formed in two sections which are connected to one another to form a box interior. A driver is mounted to a plate within the box interior so that one side of the driver is located within a sealed volume of the band-pass box and its opposite side resides in a ported volume thereof. Acoustic output from the driver entering the ported volume is transmitted through a port to the outside of the box.

Several features of this invention are designed to reduce exposure of the driver to water entering the box interior through the port. The plate which mounts the driver positions it above where water that enters the box interior may pool. A number of drain tubes are mounted over holes formed in the bottom of the band-pass box through which water may drain to further prevent pooling in the box interior. In some embodiments, the bottom wall of the band-pass box may be oriented at an angle so as to direct water that enters the box interior toward the drain tubes and/or the port.

The loudspeaker system of this invention may be utilized in watercraft to direct acoustic output from the driver toward the rear of the vessel or within its entertainment area. In watercraft that include an engine compartment, such as inboard and inboard-outboard boats, the band-pass box of this invention may be mounted to a panel which covers such compartment and is movable between open and closed, positions. The drain tubes connected to the box interior are located within the engine compartment and preferably extend to the bilge where water from the box interior is directed.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
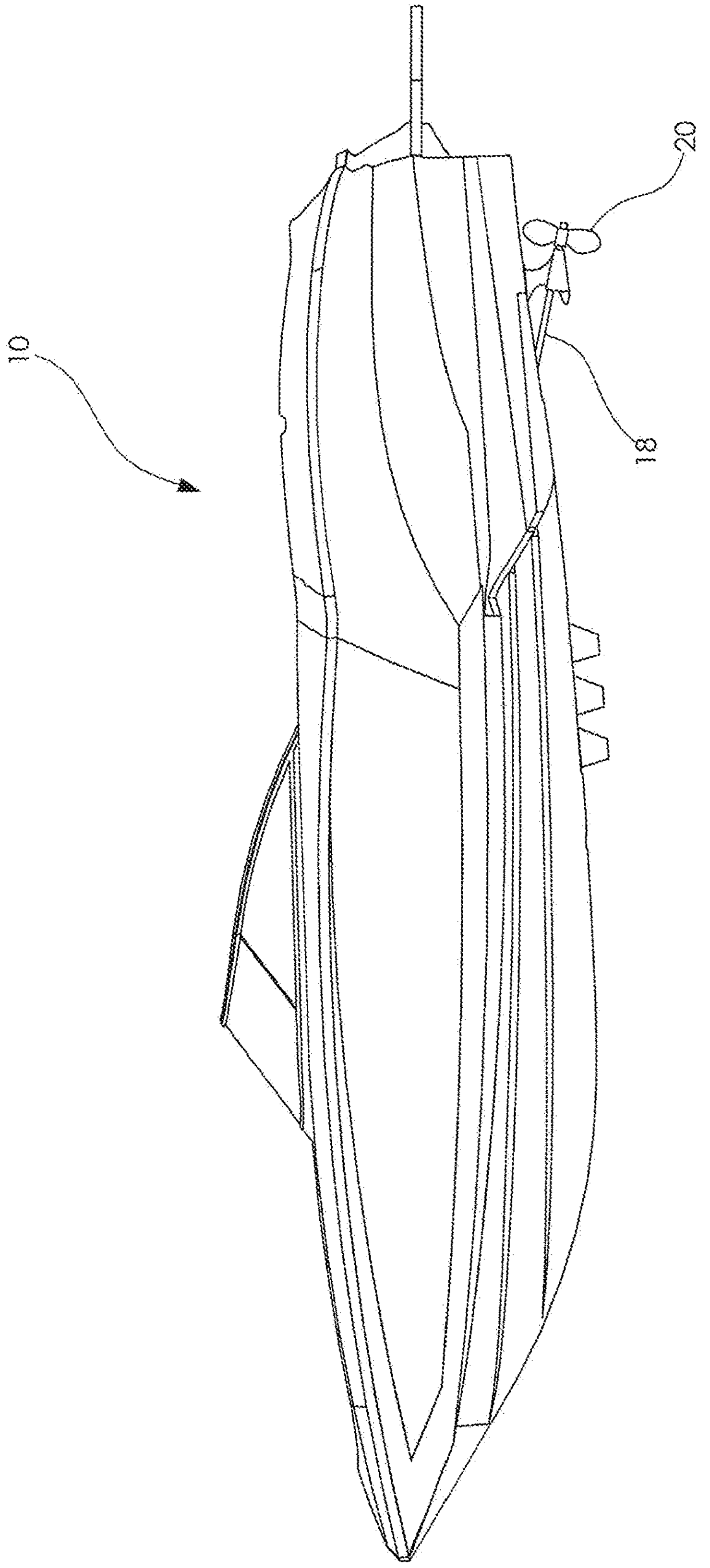
FIG. 1 is a perspective view of a watercraft with which the loudspeaker system of this invention may be utilized.
Figure 2:
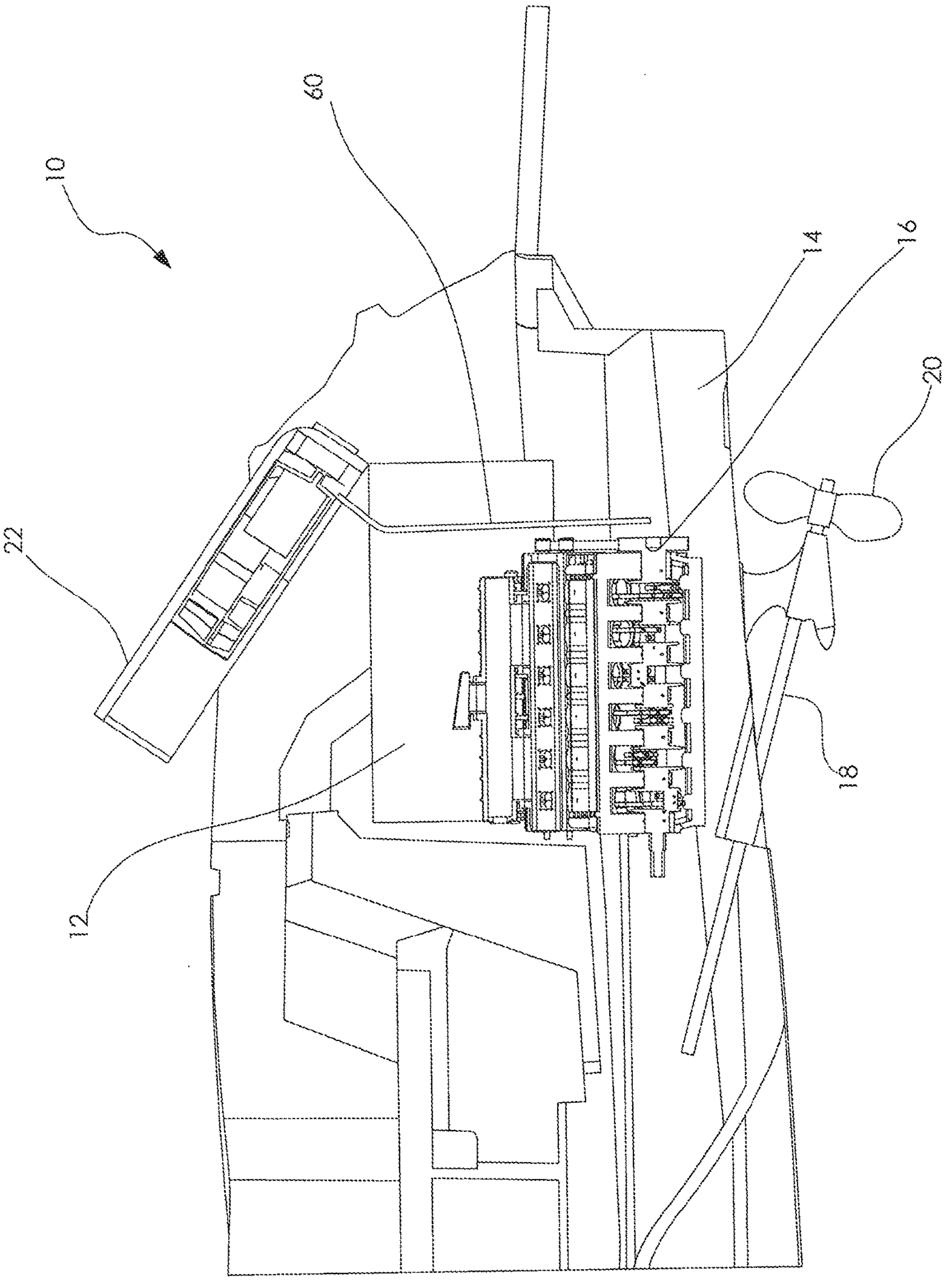
FIG. 2 is an enlarged view of the stern area of the boat depicted in FIG. 1, with part of the hull removed, illustrating the engine compartment and the loudspeaker system mounted to an engine cover panel which is shown in an open position.
Figure 3:
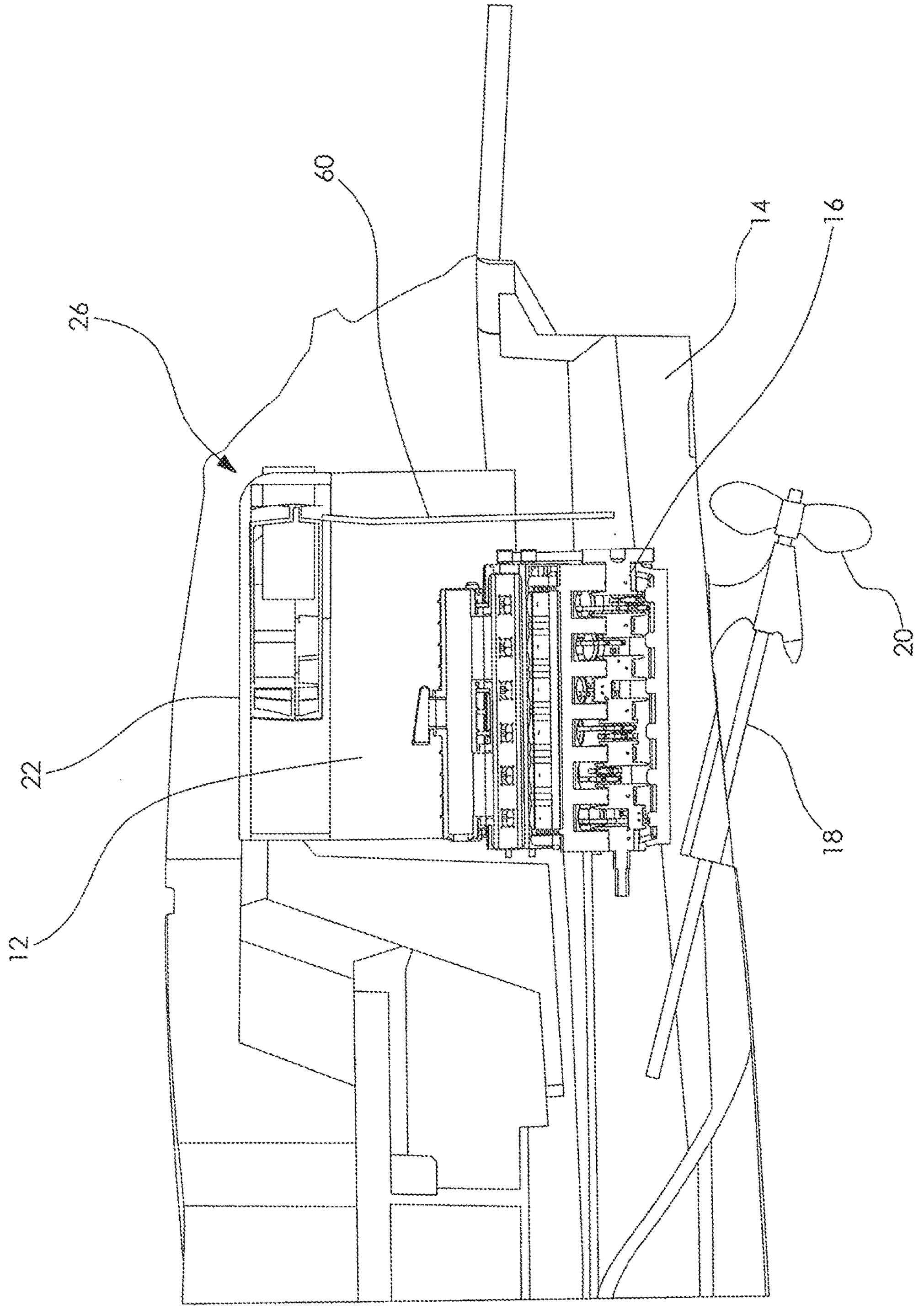
FIG. 3 is, a view similar to FIG. 3 except with the engine cover panel in the closed position.
Figure 4:
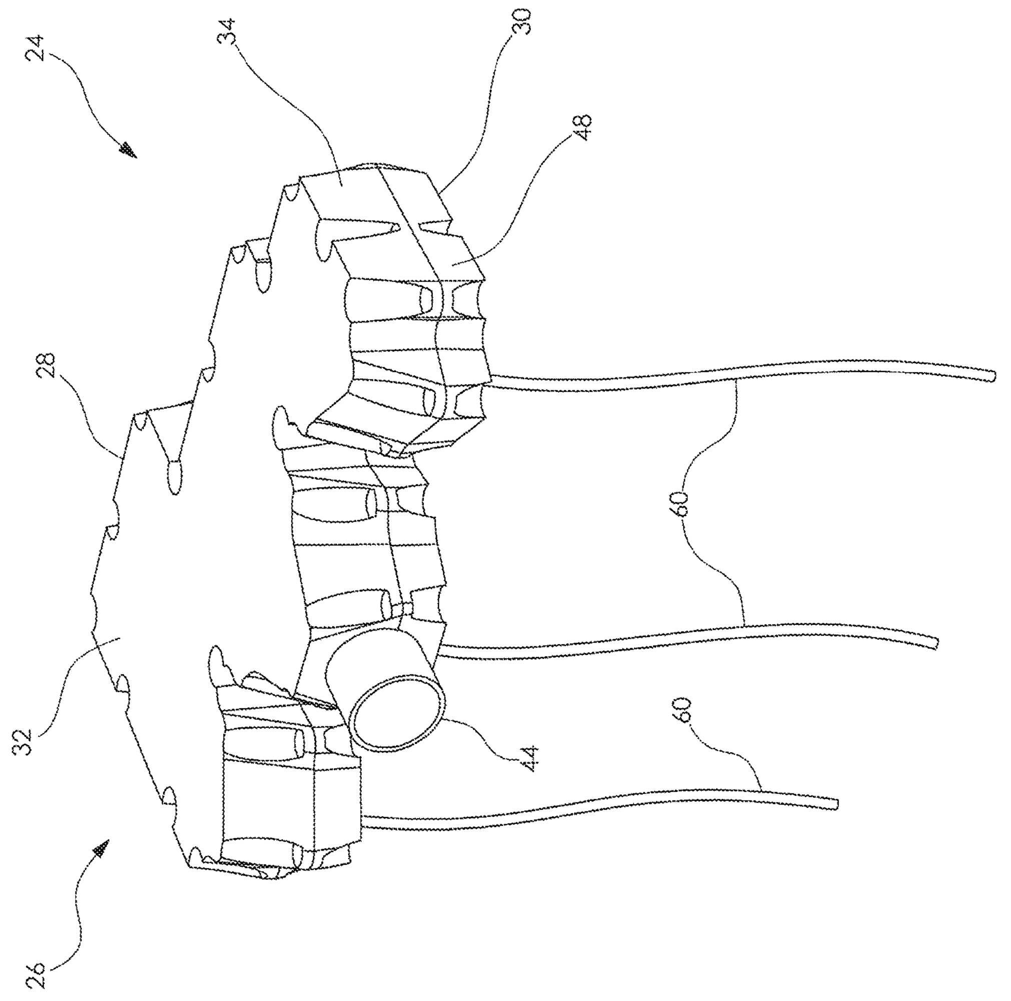
FIG. 4 is a perspective view of the assembled loudspeaker system of this invention.
Figure 5:
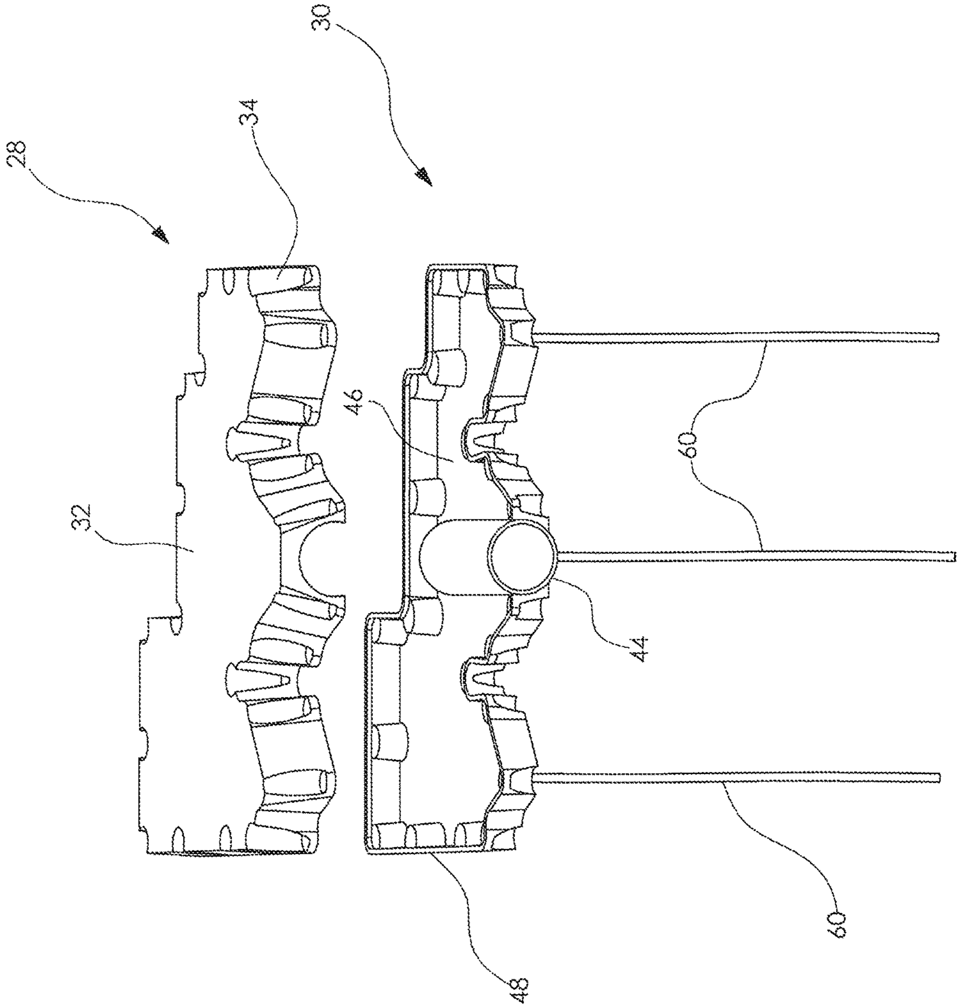
FIG. 5 is an exploded perspective view of the loudspeaker system depicted in FIG. 4, illustrating the two sections of the band-pass box of the system separated from one another.
Figure 6:
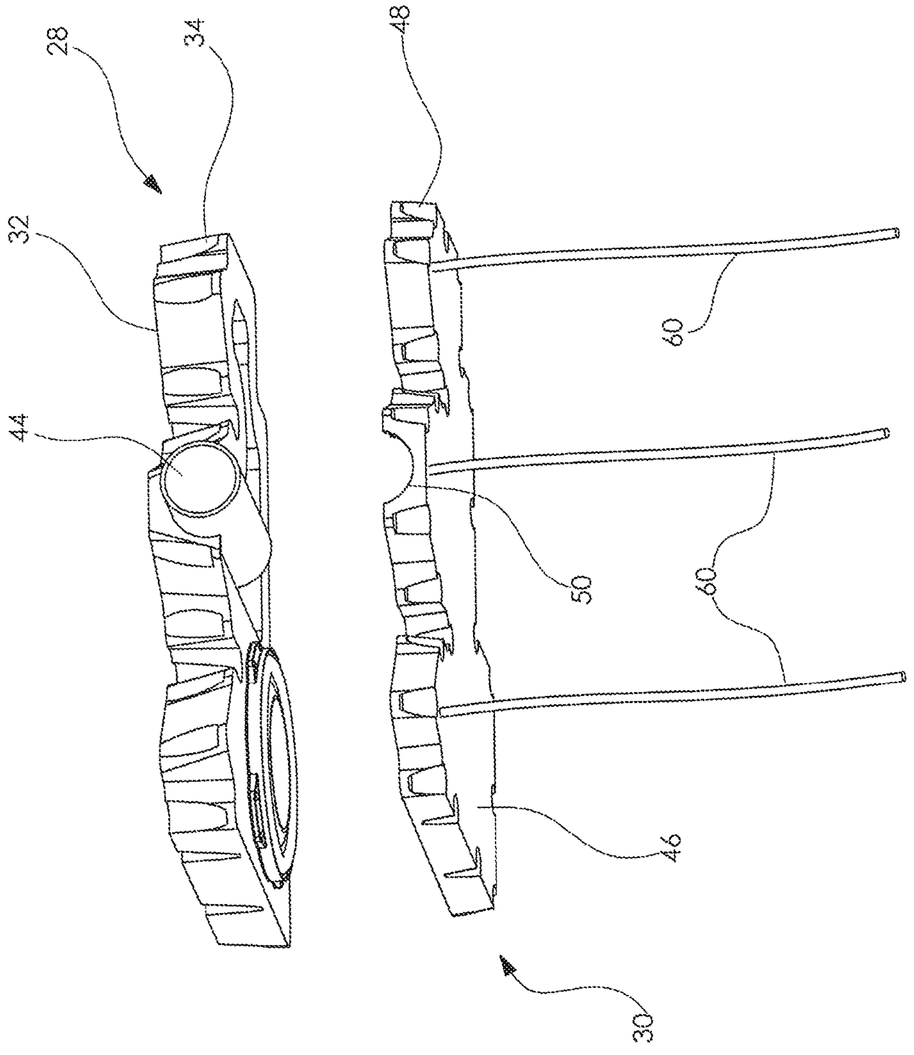
FIG. 6 is a perspective view similar to FIG. 5 except at a different angle and showing the position of the driver in the system.

Referring initially to FIGS. 1-3, a watercraft 10 is schematically illustrated having an engine compartment 12 with a bilge 14. An engine 16 is mounted in the compartment 12 which is coupled to a shaft 18 with a propeller 20 at one end. An engine cover panel 22 is hinged to the stern of the watercraft 10 and movable relative to the engine compartment 12 between an open position shown in FIG. 2 and a closed position depicted in FIG. 3.

Figure 7:
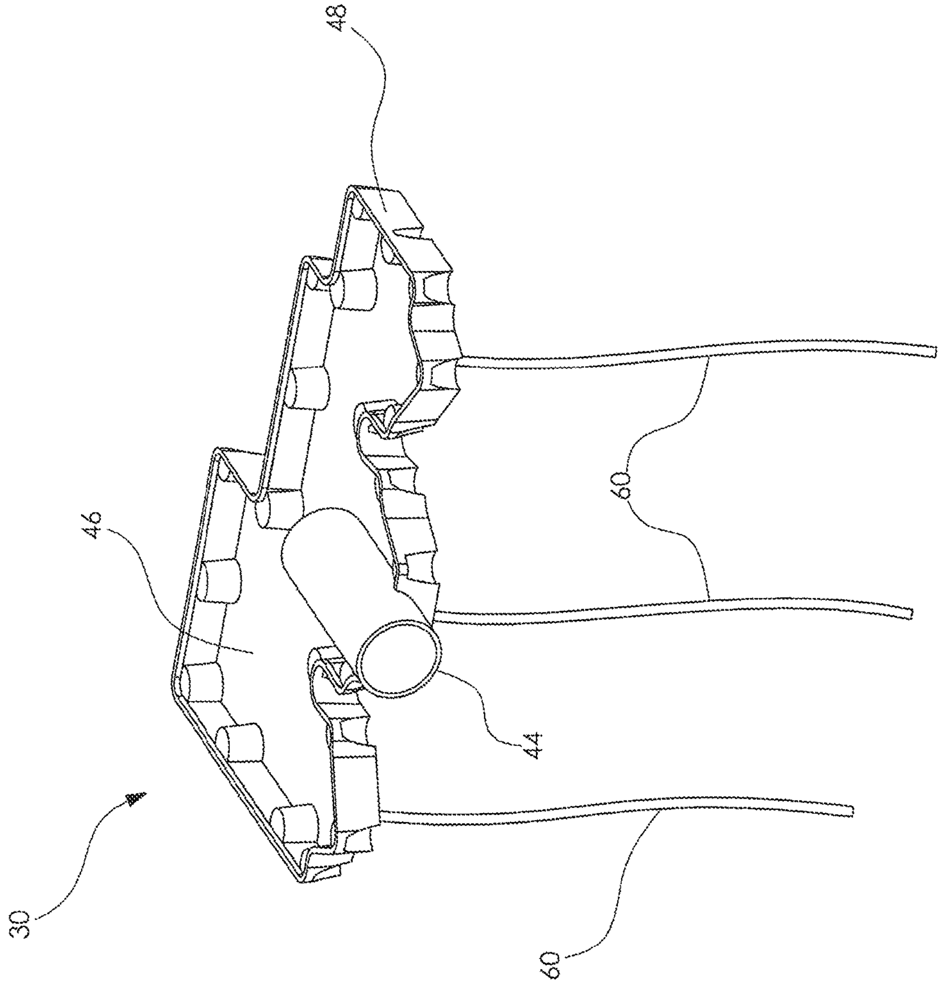
FIG. 7 is a perspective view of the lower section of the band-pass box of the loudspeaker system.
Figure 8:
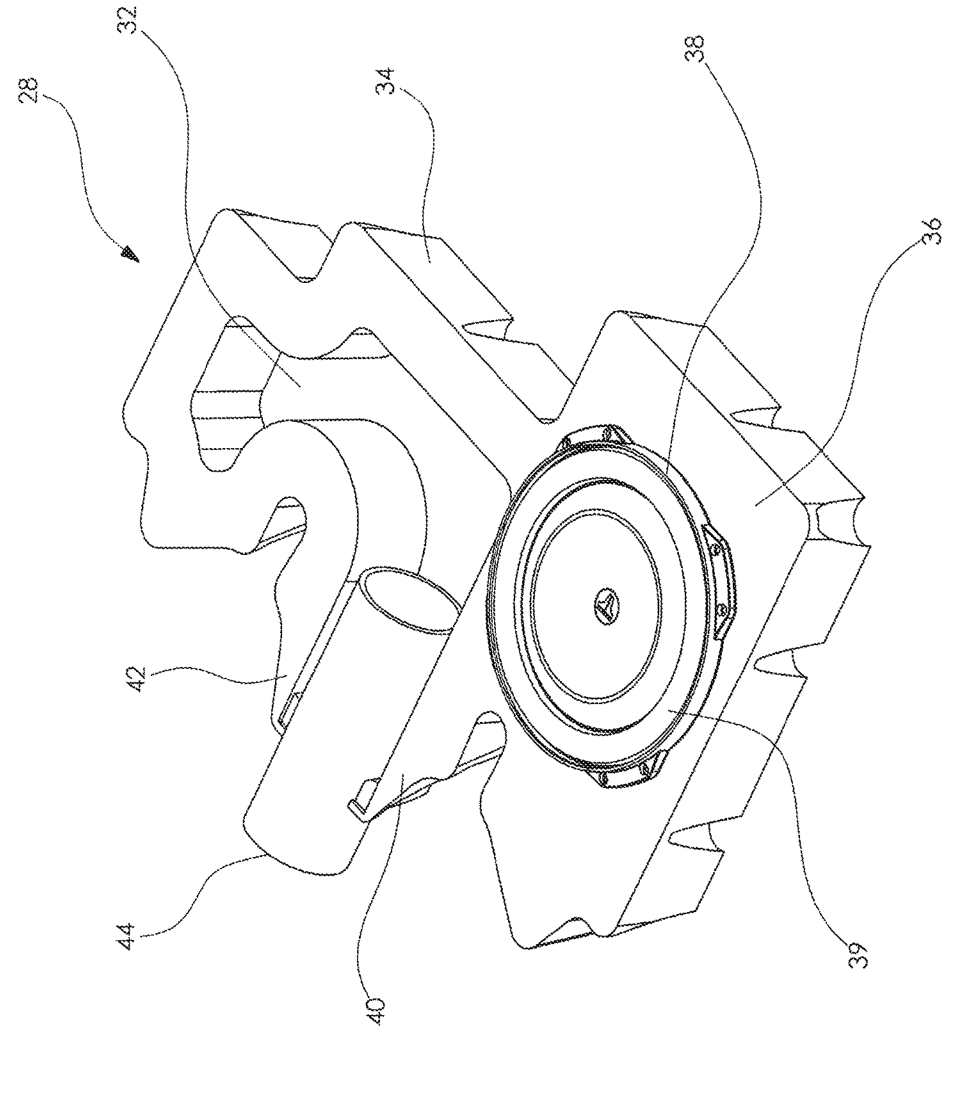
FIG. 8 is a perspective view of the upper section of the band-pass box showing the driver and a portion of the ported volume of the box.
Figure 9:
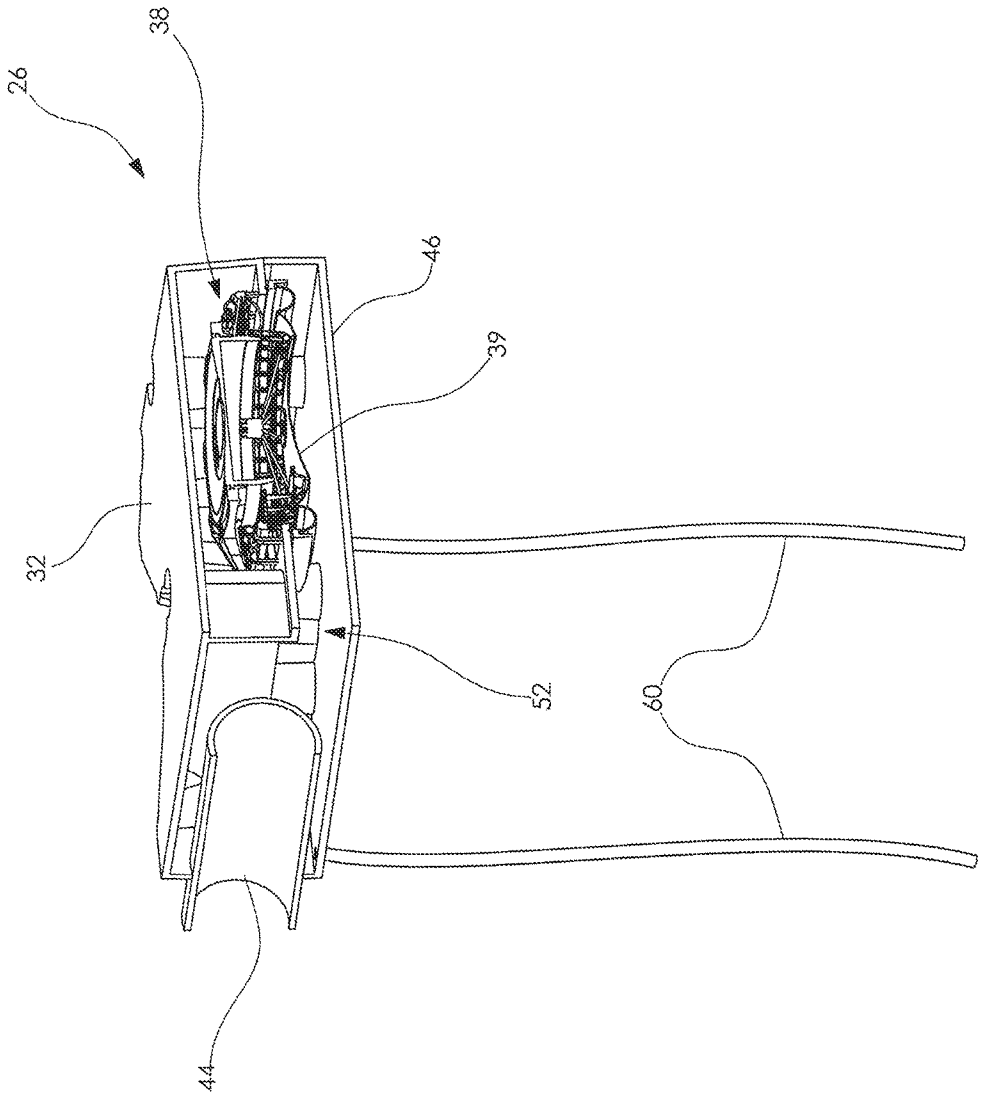
FIG. 9 is a cross sectional view of the assembled band-pass box with its back wall removed for ease of illustration.
Figure 10:
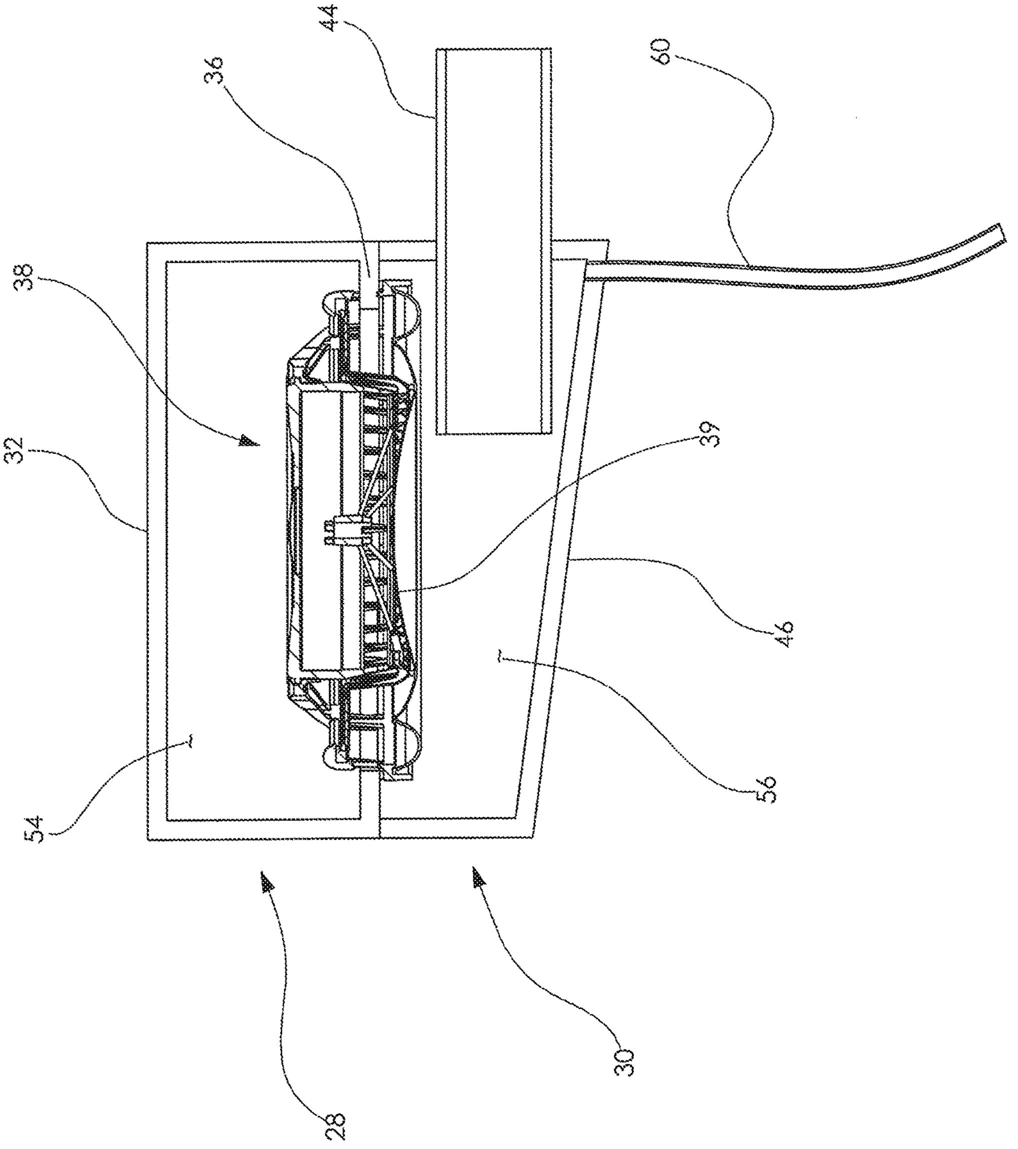
FIG. 10 is a schematic side view of an embodiment of this invention in which the bottom wall of the lower section of the band-pass box is illustrated at an angle relative to the top wall of the upper section, and the port is oriented substantially parallel to the top wall in a position spaced from the bottom wall.
Figure 11:
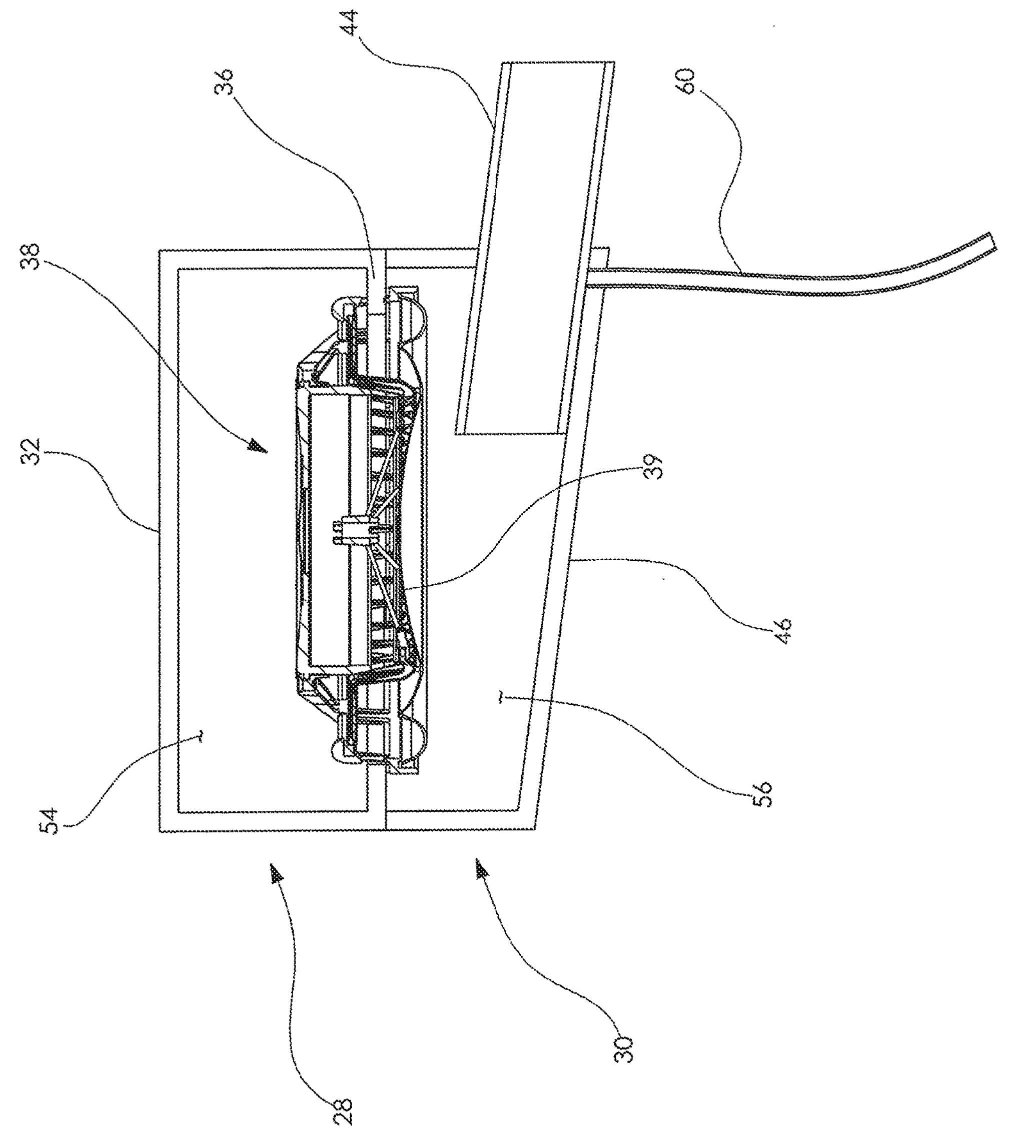
FIG. 11 is a view similar to FIG. 10 except with the port located along the bottom wall of the lower section.

With reference to FIGS. 4-9, the loudspeaker system 24 of this invention comprises a single-reflex band-pass box 26 having an upper section 28 and a lower section 30 which are permanently or releasbly connected to one another. The upper section 28 has a top wall 32 connected to a side wall 34 which extends about the periphery of the box 26. As best seen in FIGS. 8, 10 and 11, a plate 36 is secured to a portion of the base of side wall 34 which mounts a driver 38. Additionally, the side wall 34 of upper section 28 has an opening 38, defined by opposed arms 40, 42, within which part of a port 44 is secured. Referring to FIG. 7, the lower section 30 comprises a bottom wall 46 connected to a side wall 48 which has the same peripheral shape as the side wall 34 of upper section 28 so that the upper and lower sections 28, 30 may be connected to one another to form the box 26 shown in FIG. 4. Preferably, a recess 50 is formed in the side wall 48 of the lower section 30 to engage and secure the lower portion of port 44 when the upper and lower sections 28, 20 are connected together. See FIGS. 6 and 7.

When the upper and lower sections 28, 30 are connected to one another, the band-pass box 26 depicted in FIGS. 4-9 has a box interior 52 with a sealed volume 54 and a ported volume 56. The sealed volume 54 comprises the space between the plate 36 which mounts driver 38, the top wall 32 of upper section 28 and that part of the side wail 34 which extends along the plate 36. As best seen in FIGS. 8-11, the "back" side of the driver 38, opposite its cone 39, is located within the sealed volume 54 of the box interior 52. The ported volume 56 of box 26 comprises the entire volume of the box interior 52 which is located on the opposite or "front" side of the driver 38. It is defined by the space between the top and bottom wails 32, 46, bounded by the side walls 34, 48 of respective upper and lower sections 28, 30 when connected together except for the sealed volume 54 described above. All of the acoustic output from the driver 38 is directed into the ported volume 56 of the box interior 52 and exits the hand-pass box 26 through the port 44. As shown in the Figs., part of the port 44 is located within the ported volume 56 of the box interior 52, and part of it extends outwardly from the band-pass box 26.

Calculations of the ported volume, sealed volume, port diameter and port length for a band-pass box are well known in the art, and the details of same form no part of this invention. For purposes of illustration, assuming the driver 38 is a Model 12TW3 subwoofer commercially available from JL Audio, Inc. of Miramar, Fla., the sealed volume 54 may be 0.60 cubic feet, the ported volume 56 may be 0.80 cubic feet, and, the port 44 may be 4.0 inches in diameter and 11.625 inches in length. These values result in tuning the band-pass box 26 to a resonant frequency of about 54 Hz.

An important aspect of this invention are features which allow the loudspeaker system 24 to be utilized in environments where water is present, such as in watercraft 10, while minimizing or eliminating damage to the driver 38. In the embodiment shown in FIGS. 1-3, the band-pass box 26 of the loudspeaker system may be mounted to the engine cover panel 22 such that its port 44 faces rearwardly, i.e. in a direction toward a skier (not shown), for example, who may be towed by the watercraft 10. As shown in FIGS. 9-11, the plate 36 is located within the box interior 52 so that the driver 38 is positioned well above the bottom wall 46 of the lower section 30 of box 26 where water may enter through the port 44 and pool atop its bottom wall 46.

In order to prevent or at least reduce pooling of water within the box interior 52, a number of drain tubes 60 are connected to holes 62 formed in the bottom wall 46 of the lower section 30 of box 26. The drain tubes 60 extend from the box 26 to the bilge 14 of the watercraft 10 to remove water iron the box interior 52. The use of drain tubes 60 is important to ensure proper acoustic performance of the loudspeaker system 14 of this invention. If only the holes 62 in the bottom wall 46 were provided, without drain tubes 60, there would be a significant acoustic leak, i.e. wide bandwidth noise caused by high-velocity air flow created by pressure shifts within the box interior 52 resulting from operation of the driver 38. Such acoustic leakage would lower the efficiency of the loudspeaker system 24 and creates noise that could be bothersome to listeners.

The drain tubes 60 connected to the holes 62 are designed to only pass in-band signal airflow in a narrow frequency range well below the functional bandwidth of the loudspeaker system 24. In particular, the diameter and length of the drain tubes 60 are chosen so that they resonant at a specific low frequency. Due to the nature of acoustic resonance, there is only significant airflow through the drain tubes 60 in a small frequency range at which they are tuned and such tubes 60 are largely inert at other frequencies. In the particular example of the Model 12TW3 subwoofer, and assuming all of the parameters described above, a drain tube 60 having a 0.50 inch diameter and a length of about 60 inches is tuned to a resonant frequency of between 3 Hz and 5 Hz. Such frequencies are well below the tuned frequency of 54 Hz for the loudspeaker system 24.

In addition to reducing unwanted acoustic flow via resonance,the relatively long, about 60 inch drain tubes 60 having a 0.50 inch diameter create a relatively high resistance to airflow considering the surface area formed by their diameter and length. Air flowing into the drain tubes 60 engages their interior surfaces and inherently lowers the volume of air that can flow therethrough, thus highly damping the resonance of the tubes 60. This prevents "ringing" of the drain tubes 60 after excitation frequencies are removed. At the same time, however, the drain tubes 60 efficiently act as a static drain of water from the box interior 52.

Referring now to FIGS. 10 and 11, the loudspeaker system 24 may be provided with still further features to assist in protecting the driver 38 from damage. In the embodiment shown in FIG. 10, the bottom wall 46 of the lower section 30 of box 26 may be disposed at an angle relative to the port 44, the plate 36 and the top wall 32 of upper section 28, all of which are illustrated in a generally horizontal orientation as viewed in FIG. 10. Drain tubes 60 are connected to the angled bottom wall 46, and function to drain water from the box interior 52, but drainage is enhanced by angling bottom wall 46 in a direction toward such drain tubes 60, in this embodiment, the port 44 is mounted to the box 26 in position spaced above the bottom wall 46 such that little drainage of water, if any, occurs through the port 44.

The embodiment of FIG. 11 has the same construction as FIG. 10 except that the port 44 is mounted along the angled bottom wall 46. While drain tubes 60 may be employed in this embodiment, it is contemplated that a significant proportion of water entering the box interior 52 would be drained through the port 44 instead of the drain tubes 60.

Figure 12:
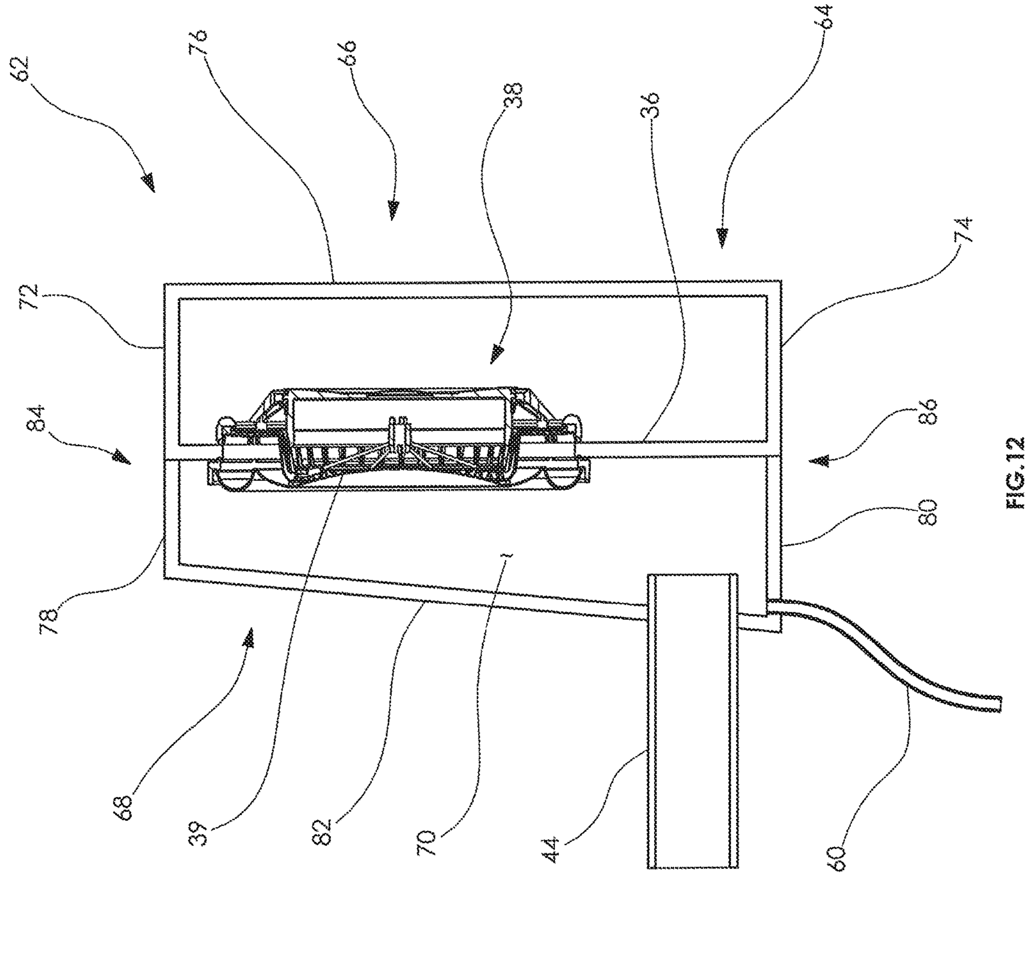
FIG. 12 is a schematic side view of a further embodiment of this invention in which the band-pass box is constructed in a substantially vertical orientation compared to the embodiments of FIGS. 1-11.
Figure 13:
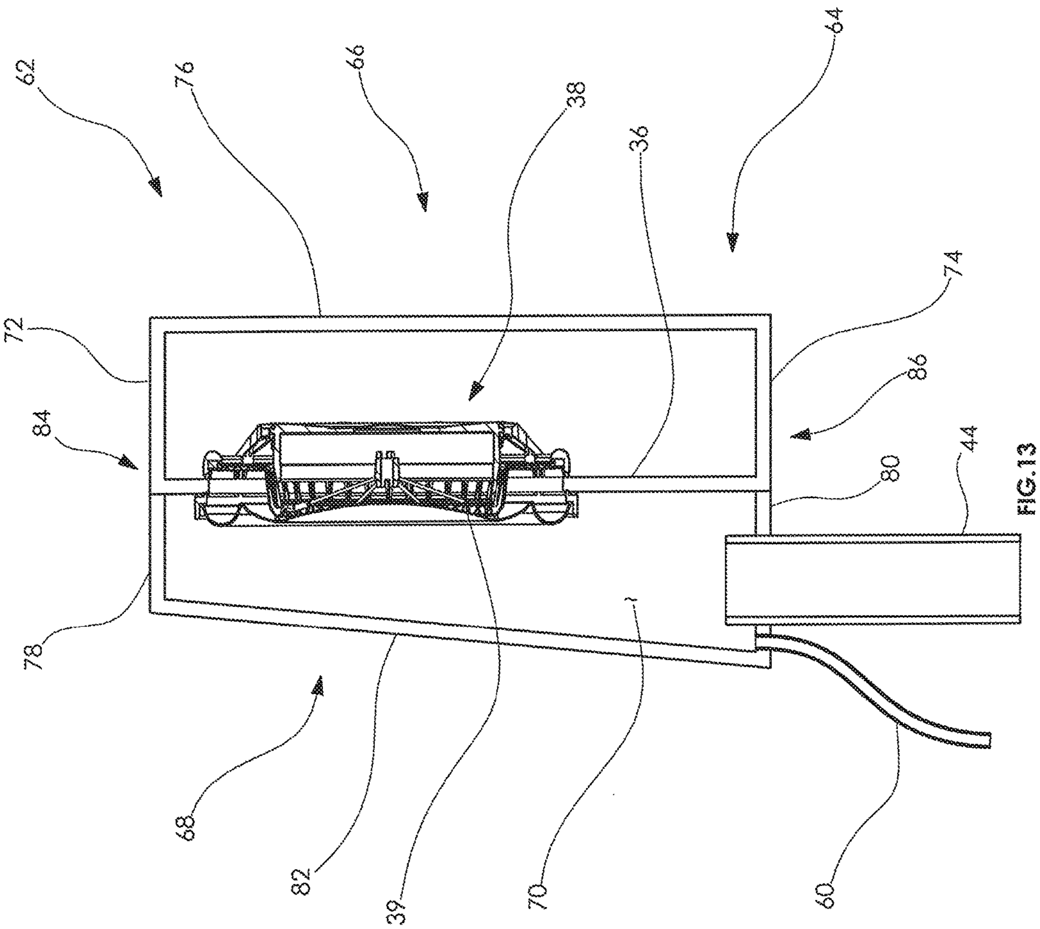
FIG. 13 is a view similar to FIG. 3 except with the port located in a different position.

Further alternative embodiments of this invention are shown in FIGS. 12 and 13. The loudspeaker system 24 illustrated in FIGS. 1-11 depict the band-pass box 26 in a generally horizontal orientation such that the top wall 32, bottom wall 46, plate 36 and driver 38 are all substantially horizontal except for the angled bottom wall 46 in FIGS. 10 and 11. It is contemplated that in some watercraft 10, due to space considerations or other design features, it may he preferable to employ a loudspeaker system 62 which is substantially vertically oriented as shown in FIGS. 12 and 13. For purposes of the present discussion, structure which is the same as in FIGS. 1-11 are denoted by the same reference numbers in FIGS. 12 and 13.

The band-pass box 64 of FIGS. 12 and 13 includes a first section 66 connected to a second section 68 defining a box interior 70. The first section 66 comprises a first end wall 72, a second end wall 74 and a first side wall 76 extending between the end walls 72, 74. The second section 68 comprises a third end wall 78, a fourth end wall 80 and a second side wall 82 extending between the end walls 78, 80. When the first and second sections 66, 68 are connected together, the first and third end walls 72, 78 collectively form a top wall 84 of the band-pass box 64, and the second and fourth end walls 74, 80 collectively form a bottom wall 86 thereof. The first section 66 includes plate 36 which mounts driver 38 as in the embodiments described above.

In the embodiment of FIG. 12, the port 44 is mounted to and extends outwardly from the second side wall 82 of the second section 68 of band-pass box 64. A number of drain tubes 60 are mounted over holes (not shown) in the fourth end wall 80 portion of bottom wall 84 to drain water entering the box interior 70 through port 44. It should be noted that the driver 38 is located along the plate 36 proximate the top wail 84 and spaced from the bottom wall 86 so as to avoid exposure to water which may pool within the box interior 70 before being discharged from the drain tubes 60 and/or port 44. The embodiment of FIG. 13 is the same as that of FIG. 12, except the port 44 is mounted to the fourth end wall 80 portion of bottom wall 86 rather than second side wail 82. Operation of the loudspeaker system 62 of FIGS. 12 and 13 is the same as that described above in connection with a discussion of FIGS. 1-11.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

The specific example of the loudspeaker systems 24 and 62 of this invention designed for use with a Model 12TW3 subwoofer are intended for illustration purposes only. Different sizes of subwoofers would require different parameters, including sealed volume, ported volume, port diameter, port length, drain tube diameter and drain tube length. The discussion given above is therefore not intended to be limited but merely indicative of the relationship between such parameters and the relative resonant frequencies of the ported volume of the band-pass box 26 and the drain tubes 60.

Additionally, the loudspeaker systems 24 and 62 are depicted as being mounted to the engine cover panel 22 of a watercraft 10 having an engine compartment 12 with a bilge 14. It is contemplated that the systems 24 or 62 could be mounted elsewhere on boats of this type, and/or be utilized with watercraft without an engine compartment such as those having outboard motors.

Therefore, it is intended that the invention not be limited to the particular embodiment disclosed as the best mode contemplated for carrying out this invention, but that the invention will include all embodiments falling within the scope of the appended claims.

What is claimed is:

1. A loudspeaker system, comprising:

a band-pass box having an upper section and a lower section, said upper and lower sections being connected to one another to collectively form a box interior;

a support mounted to said upper section, said support forming a sealed volume and a ported volume within said box interior;

a port comprising a tube having an inner portion and an outer portion, said port being connected to said band-pass box so that said inner portion extends into said ported volume of said band-pass box and said outer portion protrudes outwardly from said band-pass box;

a driver mounted to said support such that acoustic output from said driver is directed into said ported volume, through said port and outside of said box interior, said support positioning said driver relative to said lower section so that said driver is vertically spaced above and out of contact with water entering said lower section through said port which pools therein;

at least one drain tube connected to said lower section, said at least one drain tube being effective to drain water from said box interior which enters said lower section and said ported volume through said port.

2. The loudspeaker system of claim 1 in which said at least one drain tube has a low acoustic resonance compared to with said acoustic output of said driver.

3. The loudspeaker system of claim 1 in which said lower section includes a bottom wall and a first side wall extending from said bottom wall, said upper section including a top wall and a second side wall extending from said top wall, said first and second side walls being connected together to define said box interior between said top and bottom walls.

4. The loudspeaker system of claim 3 in which said bottom wall is oriented at an angle relative to said top wall so that water entering said box interior through said port flows in a direction toward said at least one drain tube.

5. The loudspeaker system of claim 4 in which said port extends along at least a portion of said bottom wall of said lower section.

6. The loudspeaker system of claim 3 in which said port is located within said box interior between said top and bottom walls, said port extending substantially parallel to said top wall of said upper section and being spaced from said bottom wall of said lower section.

7. The loudspeaker system of claim 1 in which said ported volume is tuned to a first resonant frequency and said at least one drain tube is tuned to a second resonant frequency which is lower than said first resonant frequency.

8. The loudspeaker system of claim 1 in which said at least one drain tube has a length and a diameter which are effective to assist in suppressing resonant frequencies therein.

9. The loudspeaker system of claim 1 in which said upper section includes a first end wall, a second end wall and a first side wall extending between said first and second end walls, said lower section including a third end wall, a fourth end wall and a second side wall extending between said third and fourth end walls, said first and second end walls of said upper section being connected to said third and fourth end walls of said second section, respectively, to define said box interior between said first and second side walls.

10. The loudspeaker system of claim 9 in which said first and third end walls collectively form a top wall of said band-pass box and said second and fourth end walls collectively form a bottom wall of said band-pass box.

11. The loudspeaker system of claim 10 in which said port is mounted to said second side wall of said lower section, and said at least one drain tube is connected to said fourth end wall portion of said bottom wall of said band-pass box.

12. The loudspeaker system of claim 10 in which said port and said at least one drain tube are connected to said fourth end wall portion of said bottom wall of said band-pass box.

13. The loudspeaker system of claim 10 in which said support is located between said first and second side walls such that said driver is spaced from said bottom wall of said band-pass box.

14. A watercraft having a loudspeaker system, comprising:

a hull including a bow and a stern;

a loudspeaker system mounted to said hull, comprising:

(i) a band-pass box having an upper section and a lower section, said upper and lower sections being connected to one another to collectively form a box interior;

(ii) a support mounted to said upper section, said support forming a sealed volume and a ported volume within said box interior;

(iii) a port comprising a tube having an inner portion and an outer portion, said port being connected to said band-pass box so that said inner portion extends into said ported volume of said band-pass box and said outer portion protrudes outwardly from said band-pass box;

(iv) a driver mounted to said support such that acoustic output from said driver is directed into said ported volume, through said port and outside of said box interior, said support positioning said driver relative to said lower section so that said driver is vertically spaced above and out of contact with water entering said lower section through said port which pools therein;

(v) at least one drain tube connected to said lower section, said at least one drain tube being effective to drain water from said box interior which enters said lower section and said ported volume through said port.

15. The watercraft of claim 14 in which said hull is formed with an engine compartment having a bilge, said watercraft further including an engine compartment panel connected to said hull and movable between an open position to permit access to said engine compartment and a closed position, said band-pass box being mounted to said engine compartment panel.

16. The watercraft of claim 15 in which said at least one drain tube directs water from said box interior to said bilge.

17. The loudspeaker system of claim 14 in which said ported volume is tuned to a first resonant frequency and said at least one drain tube is tuned to a second resonant frequency which is lower than said first resonant frequency.

18. The watercraft of claim 14 in which said at least one drain tube has a length and a diameter which are effective to assist in suppressing resonant frequencies therein.

19. A loudspeaker system, comprising:

a band-pass box having an upper section and a lower section, said upper and lower sections being connected to one another to collectively form a box interior;

a support mounted to said upper section, said support forming a sealed volume and a ported volume within said box interior;

a port connected to said lower section in communication with said ported volume, said port having a port diameter and a port length, said ported volume, said sealed volume, said port diameter and said port length collectively being tuned to a first resonant frequency;

a driver mounted to said support such that acoustic output from said driver is directed solely into said ported volume, through said port and outside of said box interior, said support positioning said driver relative to said lower section so that said driver is vertically spaced above and out of contact with water entering said lower section through said port which pools therein;

at least one drain tube having a first end connected to an opening in said lower section in communication with said ported volume and a second end located outside of and spaced from said box interior, said at least one drain tube having a tube diameter and a tube length collectively tuned to a second resonant frequency which is less than said first resonant frequency, said at least one drain tube being effective to drain water from said box interior which enters said lower section and said ported volume through said port.

20. The loudspeaker system of claim 19 in which said diameter and said length of said at least one drain tube are collectively effective to assist in suppressing resonant frequencies therein except for said second resonant frequency.

21. A watercraft having a loudspeaker system, comprising:

a hull including a bow and a stern;

a loudspeaker system mounted to said hull, comprising:

a band-pass box having an upper section and a lower section, said upper and lower sections being connected to one another to collectively form a box interior;

(ii) a support mounted to said upper section, said support forming a sealed volume and a ported volume within said box interior;

(iii) a port connected to said lower section in communication with said ported volume, said port having a port diameter and a port length, said ported volume, said sealed volume, said port diameter and said port length collectively being tuned to a first resonant frequency;

(iv) a driver mounted to said support such that acoustic output from said driver is solely directed into said ported volume, through said port and outside of said box interior, said support positioning said driver relative to said lower section so that said driver is vertically spaced above and out of contact with water entering said lower section through said port which pools therein;

(v) at least one drain tube having a first end connected to an opening in said lower section in communication with said ported volume and a second end located outside of and spaced from said box interior, said at least one drain tube having a tube diameter and a tube length collectively tuned to a second resonant frequency which is less than said first resonant frequency, said at least one drain tube being effective to drain water from said box interior which enters said lower section and said ported volume through said port.

22. The watercraft of claim 21 in which said diameter and said length of said at least one drain tube are collectively effective to assist in suppressing resonant frequencies therein except for said second resonant frequency.

* * * * *